Nov. 20, 1962 A. M. ANDREWS 3,065,121
METHOD AND APPARATUS FOR JOINING TOGETHER
SHEETS OF PLASTIC MATERIAL
Filed Aug. 26, 1957 4 Sheets-Sheet 1

*INVENTOR.*
ALVADORE M. ANDREWS
*BY*
BUCKHORN, CHEATHAM & BLORE

*ATTORNEYS*

Nov. 20, 1962 A. M. ANDREWS 3,065,121
METHOD AND APPARATUS FOR JOINING TOGETHER
SHEETS OF PLASTIC MATERIAL
Filed Aug. 26, 1957 4 Sheets-Sheet 2

INVENTOR.
ALVADORE M. ANDREWS
BY
BUCKHORN, CHEATHAM & BLORE
ATTORNEYS

Nov. 20, 1962  A. M. ANDREWS  3,065,121
METHOD AND APPARATUS FOR JOINING TOGETHER
SHEETS OF PLASTIC MATERIAL
Filed Aug. 26, 1957  4 Sheets-Sheet 3

INVENTOR.
ALVADORE M. ANDREWS
BY
BUCKHORN, CHEATHAM & BLORE

ATTORNEYS

Nov. 20, 1962 A. M. ANDREWS 3,065,121
METHOD AND APPARATUS FOR JOINING TOGETHER
SHEETS OF PLASTIC MATERIAL
Filed Aug. 26, 1957 4 Sheets-Sheet 4

INVENTOR.
ALVADORE M. ANDREWS
BY
BUCKHORN, CHEATHAM & BLORE
ATTORNEYS 3,065,121
METHOD AND APPARATUS FOR JOINING TOGETHER SHEETS OF PLASTIC MATERIAL
Alvadore M. Andrews, 4621 SW. Beaverton-Hillsdale Highway, Portland, Oreg.
Filed Aug. 26, 1957, Ser. No. 680,050
5 Claims. (Cl. 156—201)

The present invention relates to method and apparatus for joining together sheets of material.

Many sheet materials such as synthetic plastic are, for practical reasons of manufacture, supplied in narrow widths of say 4 to 6 feet, but in lengths of several hundred feet or more and are conventionally wound lengthwise upon rolls by the supplier. For many purposes, sheets of substantially greater width are desired and which can be formed only by joining several such narrow sheets edge to edge.

It is an object of the present invention to provide a new and improved apparatus useful in joining relatively narrow elongate sheets of material in edge to edge relation so as to form a wider sheet element.

More particularly, it is an object of the invention to provide an apparatus for withdrawing a number of sheets of material from rolls of the same, joining such sheets edgewise to form a single wide sheet element and rewinding the sheets into a roll not substantially wider than the width of the original rolls of the material.

Another object of the invention is to provide a new and improved method and apparatus for securing together desired portions of superimposed sheets of material with an adhesive, but preventing adjacent portions of the sheets to accidentally be adhered to one another.

Other and further objects of the invention will become more apparent hereinafter.

In accordance with the illustrated embodiment of the invention, sheets of material to be joined are unwound from supply rolls of the same and led into substantially overlapping relation. Simultaneously, as the sheets are so positioned, the edge portions of certain of said sheets are overfolded between such certain sheet and the next adjacent sheet and means are provided to secure the surface of the overfolded portion of one sheet to the adjacent surface of the adjacent sheet to form a single sheet element, the joined sheets then being led and rewound in overlapping relation upon a rewind or finish roll.

For a more detailed description of the invention, reference is made to the accompanying drawings wherein.

Figure 1:
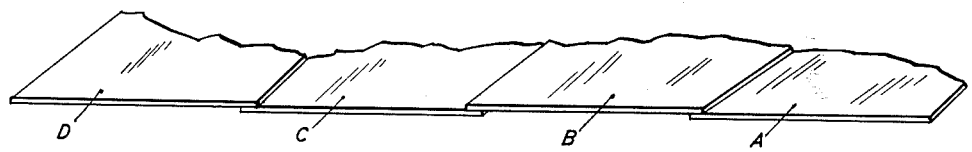
FIG. 1 is a fragmentary perspective view of a wide sheet of material joined from narrower sheets in accordance with the invention.
Figure 2:
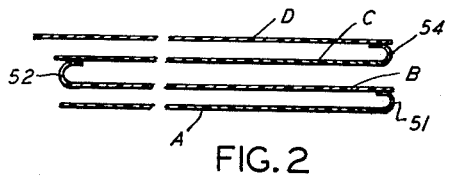
FIG. 2 is a schematic end view showing how the joined individual sheets are arranged relative to one another in their folded condition on the machine of the invention at the position indicated by the arrows 2—2 in FIG. 4.

Referring first to FIGS. 1 to 4, inclusive, in accordance with the present invention, individual and relatively narrow sheets of material, such as, for example, vinyl plastic are withdrawn from supply rolls indicated at 20, 22, 24 and 26 and are positioned in generally overlapping arrangement as indicated in FIG. 2 while simultaneously joining certain edges of the sheets to one another, the joined sheets thereafter being rerolled in overlapping arrangement upon a finish roll 30. The individual sheets A, B, C, D from the rolls 20, 22, 24, 26, respectively, are so joined together that they may be unfolded after joining to form a single flat sheet of extended width as indicated in FIG. 1. Further details of the arrangement by which the sheets are joined to each other and of the methods therein employed will be described in further detail in connection with the description of the apparatus of the invention and its operation.

Referring now more particularly to FIGS. 5, 6, 7 and 8, the machine of the invention includes a supporting frame structure including a plurality of opposite paired uprights 40, 42, 44 and 46. Mounted between the uprights 40 in vertically spaced relation are the supply rolls 22 and 26 supported on suitable bearings 48 attached to the uprights. The supply rolls 20 and 24 are suitably mounted in bearings 49 in vertically spaced relation between the uprights 42.

Figure 4:
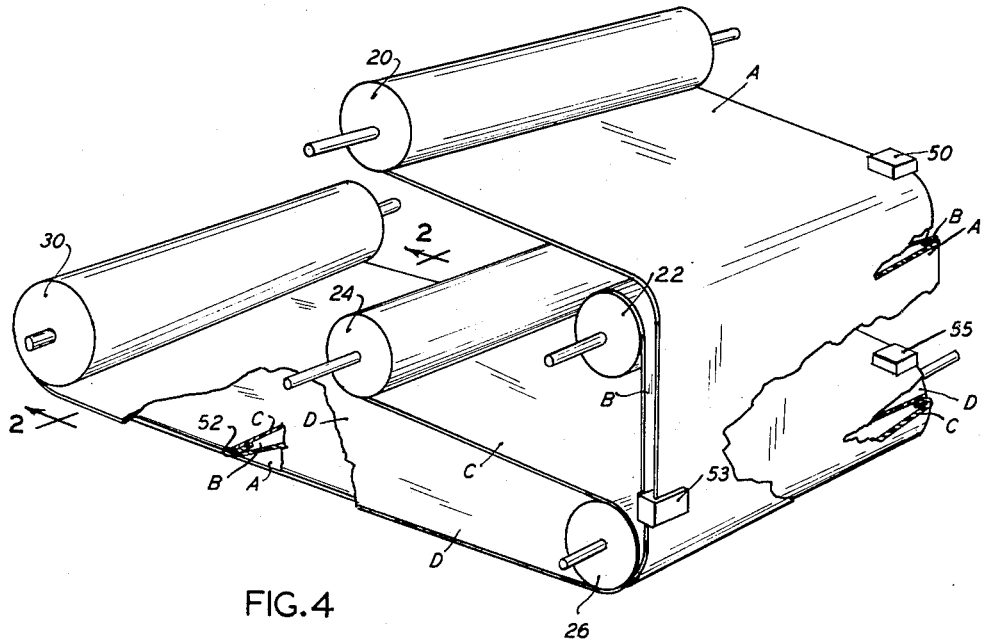
FIG. 4 is a schematic perspective view of a machine constructed in accordance with the invention.
Figure 5:
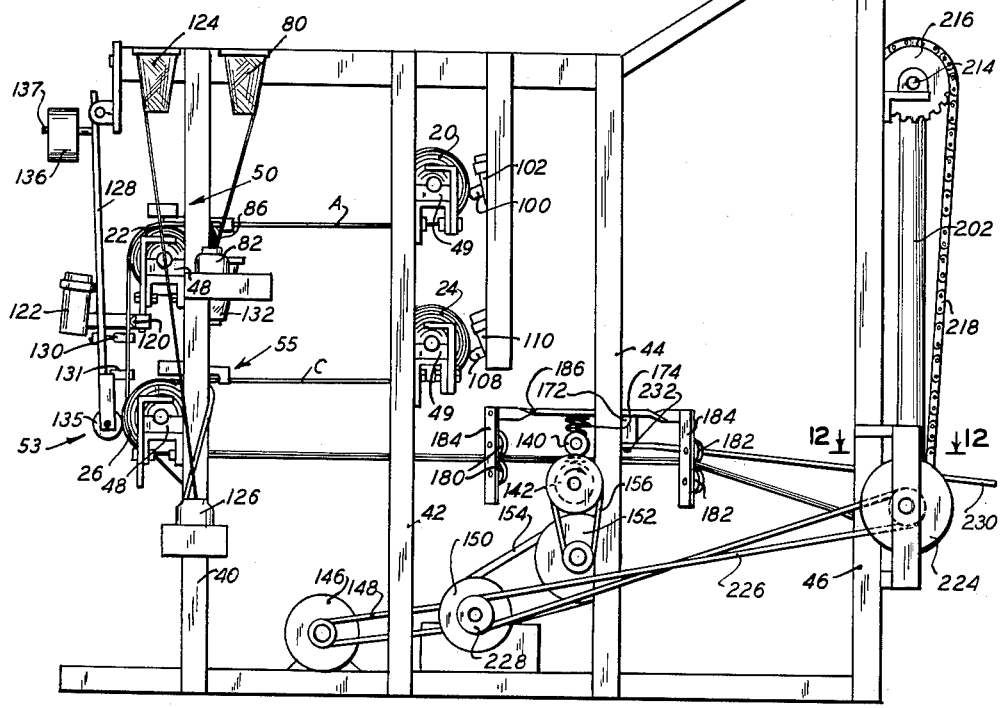
FIG. 5 is a side elevation of a machine constructed in accordance with the invention.
Figure 7:
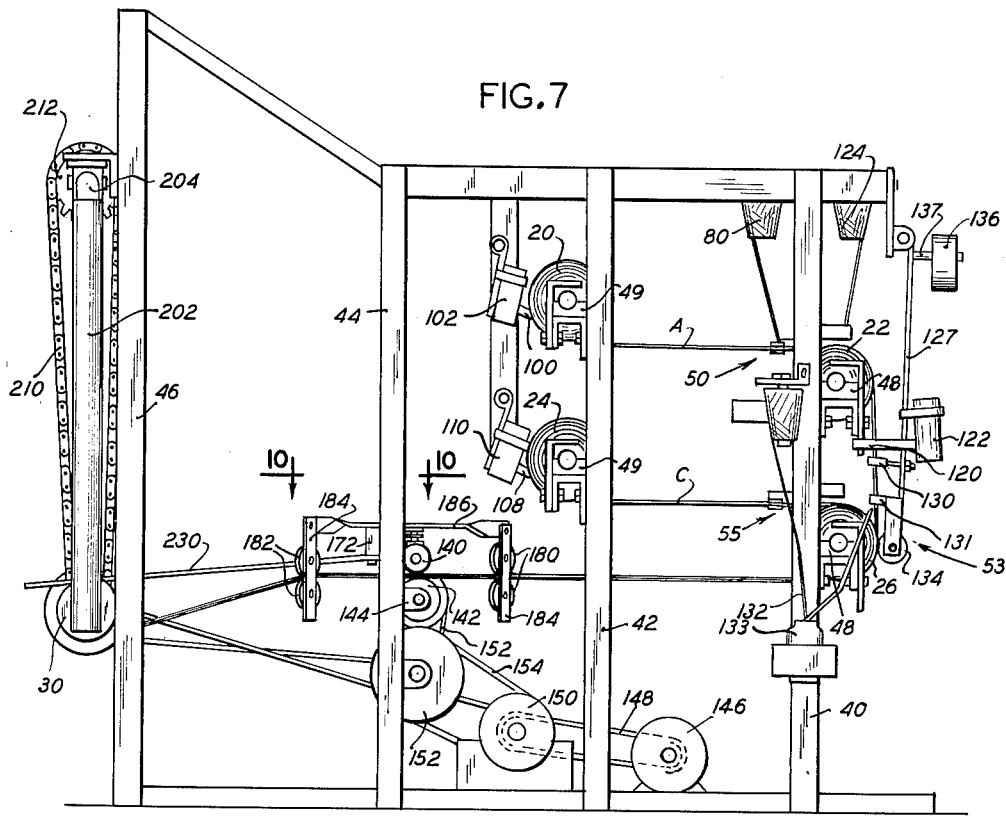
FIG. 7 is a further side view of the machine of the invention looking at it from the side opposite that shown in FIG. 5.

As indicated in FIGS. 4, 5 and 7, sheet A from the roll 20 is trained over the top of the supply roll 22 and is then led downwardly and beneath the supply roll 26 from which it is led to the rewind or finish roll 30 supported in a manner to be described hereinafter. Sheet B which unrolls from the supply roll 22 passes downwardly therefrom and beneath the supply roll 26 in contact with sheet A, while sheet C unrolling from the supply roll 24 also passes over roll 26 on the inner side of sheet B and in contact with sheet D which unrolls from roll 26 simultaneously as sheet C passes thereover. All four sheets are led simultaneously and in an overlapped relation to the rewind roll 30 where they are rewound thereupon.

Means are provided for effecting a union between the edge portions of certain said sheets as they are brought into contact with one another. Referring particularly to FIG. 4, as sheet A approaches roll 22 one of the edges thereof, the right edge as viewed, is passed through a folding device indicated schematically at 50 so as to fold the right edge portion of sheet A between sheet A and sheet B as indicated at 51 in FIG. 3.

In similar manner the edge 52 of the sheet B opposite that to which the sheet A is joined on left edge, is overfolded and secured to the sheet C by means of a folding device indicated schematically at 53 in FIG. 4. The edge 54 of the sheet C opposite that joined to B is likewise underturned and joined to the corresponding edge of the sheet D by means of a folding device indicated in FIG. 4 at 55.

Figure 9:
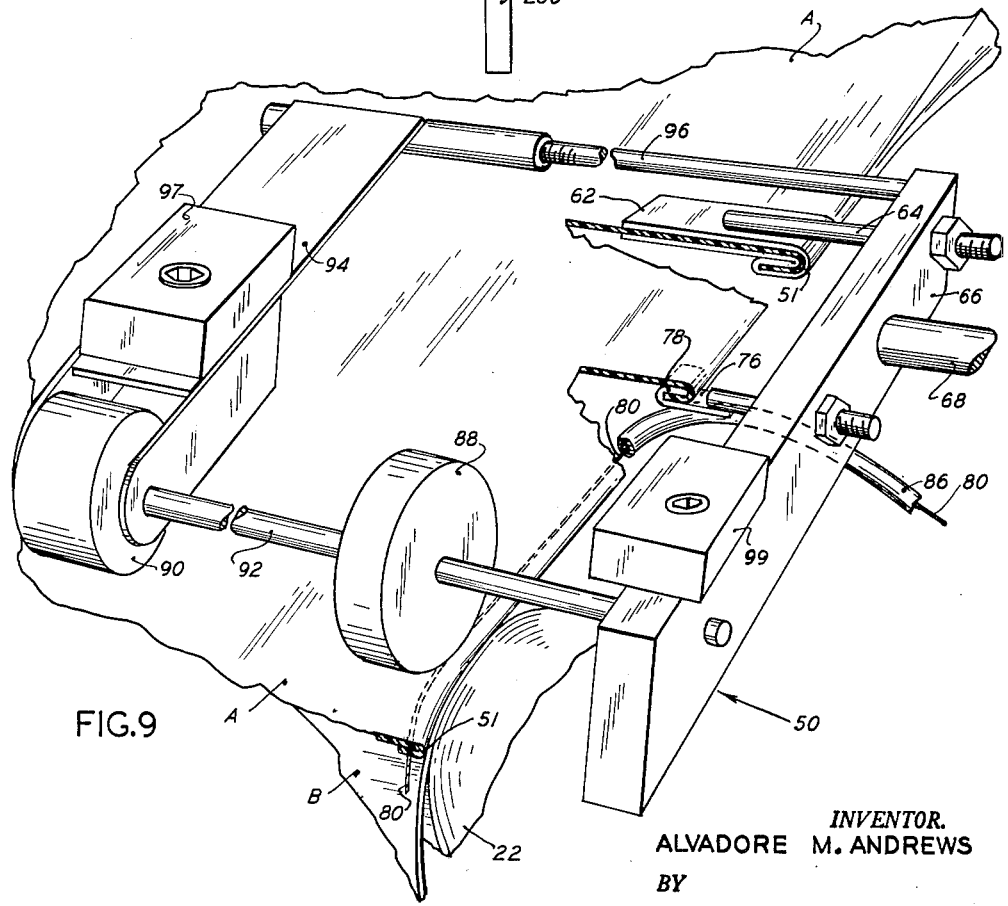
FIG. 9 is an enlarged fragmentary perspective view of apparatus for forming the seam between the adjacent sheets in accordance with the invention.

The folding devices 50, 53 and 55 are substantially similar and thus only the device 50 will be described in detail. Referring to FIG. 9, the folding device 50 includes a J-shaped folding cone 62 mounted on a bracket 64 extending from an arm 66 pivotally mounted on the frame of the machine by a shaft 68. As the edge portion of the sheet A is pulled through the cone 62, the edge is turned under as indicated at 51 and preferably by a distance slightly greater than the desired folded depth. To regulate the depth of the fold and maintain it at a uniform width, the sheet A is passed from folding cone 62 through a U-shaped sizing device 76 mounted on the arm 66 and having a leg 78 adapted to extend into the fold of the sheet and to reduce the width of the fold to the length of the leg.

While the overfolded portion 51 of the sheet A may be joined to the edge of the sheet B by any suitable means, a union is conveniently effected by utilizing the principles and apparatus described and claimed in my prior Patents No. 2,495,680 and 2,500,053. In accordance with the practices of these patents, a bond effecting fluid is positioned between the overfolded edge 51 and the sheet B by passing a thread through a supply of such fluid and interfeeding the thread between the sheet B and the edge portion 51 of the sheet A. Thus in the present invention, a supply of thread 80 (FIG. 5) is suitably mounted on the frame of the machine and from which the thread is led through a reservoir 82 of suitable bond effecting fluid so that a supply of the fluid may be absorbed by the thread. The thread is then fed and positioned between the edge portion 51 and sheet B as the sheets are moved together. In joining sheets of plastic, such as a polyvinyl resin, suitable bonding materials include highly volatile solvents for such resin and, hence, the thread is preferably led from the reservoir through a tube 86 to minimize volatilization of the fluid.

Preferably, means are provided for applying pressure so as to express the fluid from the thread and between the folded edge 51 and the sheet B. In the illustrated embodiment of the invention and again referring to FIG. 9, pressure is applied by means of a pressure disc 88 mounted so as to press the edge 51 of sheet A and sheet B against the supply roll 22. The pressure disc 88 is preferably driven by a drive roll 90 mounted on an axle 92 upon which the disc 88 is also mounted and to which both the wheel and disc are secured so as to turn with the axle. Preferably, the wheel 90 is of slightly smaller diameter than the disc 88 and is of greater width so as to have greater frictional engagement with the surface of the plastic sheet so that the disc 88 will be driven at a slightly greater peripheral rate of speed than the rate of advance of the sheet A. This will serve to place tension along the edge of the sheet and prevent the formation of any puckering along the seam. The axle 92 is journaled at one end in the arm 66 and is journaled at its other end on a bracket 94 suspended from the arm 66 by a rod 96. Weights 97 and 99 may be placed on the bracket 94 and arm 66 to bias the drive wheel and disc 88 into engagement with the plastic sheet A.

Figure 3:
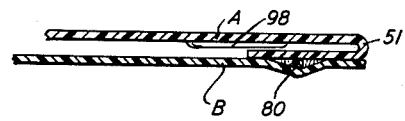
FIG. 3 is an enlarged fragmentary sectional view showing a seam or joint between sheets joined in accordance with the invention.

Referring to FIG. 3, it will be obvious that fluid expressed from the thread 80 might at times flow outwardly from the overfolded portion 51 and between the sheets A and B, and which, if that occurred, would cause sealing between the sheets A and B inwardly at the folded edge, and which is not desired. I have found that this can be prevented by simply wetting with water or other suitable liquid, which is non-miscible with the bonding fluid, the surface of sheet A over the area in which bonding fluid might possibly come into contact, such as the area indicated at 98 in FIG. 3.

In the apparatus of the present invention, the protective liquid film 98 is applied to the sheet A by means of a wiper comprising a sponge or other wick-like body 100, see FIG. 5, having one end mounted to contact with the sheet A over the desired area before it enters the folding cone 62, with the other end of the body immersed in a reservoir 102 of the protective liquid. Thus, as the sheet A unrolls from the roll 20, a film of protective liquid is automatically applied to the surface of sheet A over the desired area. Similarly, the desired portion of the surface of sheet C is coated with the protective liquid by a wick 108 (FIG. 5) extending from a reservoir 110 of the protective liquid and sheet B is coated by means of a wick 120 leading from a reservoir 122.

The folding device 55 is substantially similar to the device 50 described above and, hence, further details will not be described except to point out that thread used in placing bonding fluid between sheet C and sheet B is drawn from a supply 124 and through a bonding fluid reservoir 126.

Figure 8:
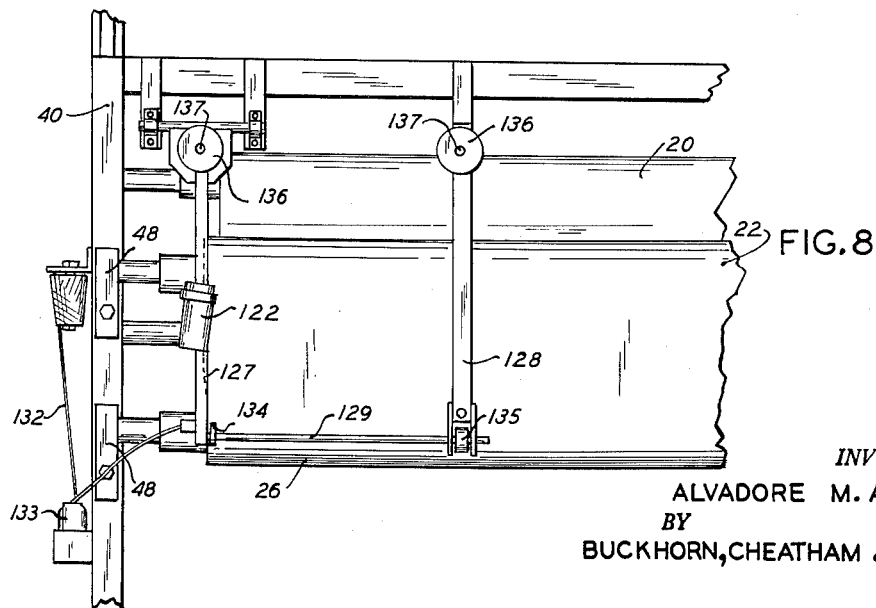
FIG. 8 is a fragmentary view of the front end of the machine.

Componentwise the folding device 53 for the edge of sheet B is similar to the device 50 but the suspension of the device 53 is somewhat different as will appear in the description thereof following. Referring to FIG. 8, swingable suspended on the front of the machine are a pair of arms 127, 128 having an axle 129 journaled in their lower ends. The folding device 53, including a folding cone 130 and a fold depth regulator 131 (FIG. 7), is mounted on the arm 127 as is a reservoir 122 and wick 120. Fixed to the axle 129 is a pressure disc 134 and a drive wheel 135 biased toward the roll 26 by means of weights 136 mounted on projections 137 extending from the arms 127 and 128.

Figure 6:
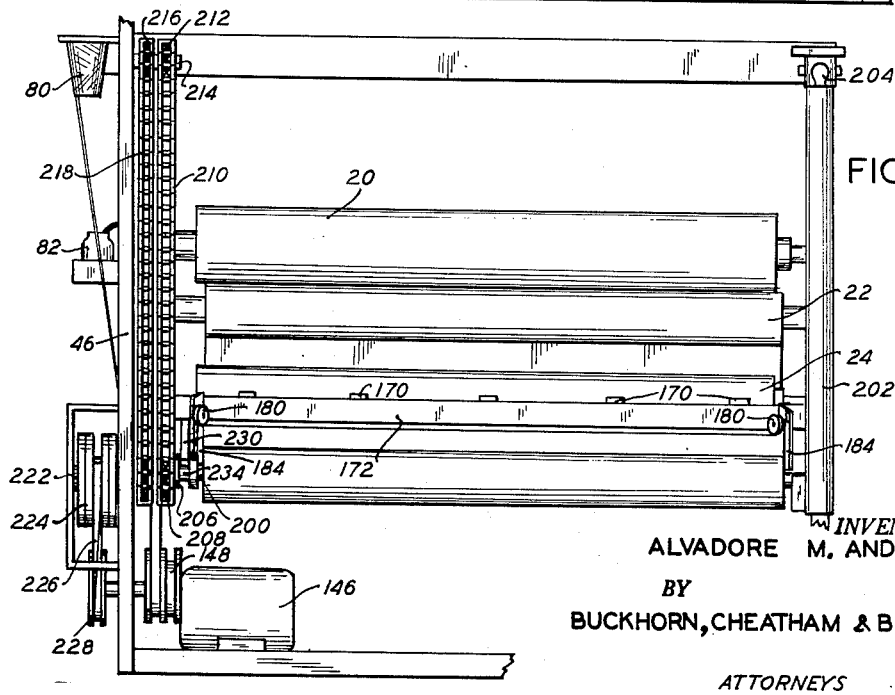
FIG. 6 is a view of the discharge end of the machine of the invention.

As indicated in FIGS. 4 and 6, supply rolls 20, 22, 24 and 26 are laterally offset with respect to one another by twice the width of the folded edge and in the necessary direction so that when the folded edge is brought into contact with the sheet to which it is being attached, the fold line will be directly in line with the straight edge of the other sheet as best shown in FIGS. 2 and 3.

As the joined sheets A, B, C, and D pass together under the roll 26, they are led horizontally toward the rewind roll 30, first passing between a pair of draw rolls 140 and 142, FIGS. 5 and 7. The roll 142 is journaled in bearings 144 mounted on the frame members 44 and is driven in the direction indicated by the arrow in FIG. 5 from a motor 146 connected by a belt 148 to a variable speed pulley 150, in turn connected to a reducing speed pulley 152 by a belt 154, the roll 142 being connected to the pulley 152 by a belt 156. The draw roll 140 is formed of a series of sections (see FIG. 10) mounted on a common axle 164 extending transversely of the machine, the axle being supported at the intervals between the rolls in small journal boxes 166 having vertically extending pins 168 secured thereto. The pins 168 are supported in arms 170 for vertical movement, the arms being fixed to a cross brace 172 extending between the frame members 44. A spring 174 is positioned about the pin 168 between the arm 170 and the body 166 to bias the body downwardly thus to cause the draw roll 140 to press toward the opposite draw roll 142 and pressurably engage sheets A, B, C and D therebetween.

Figure 10:
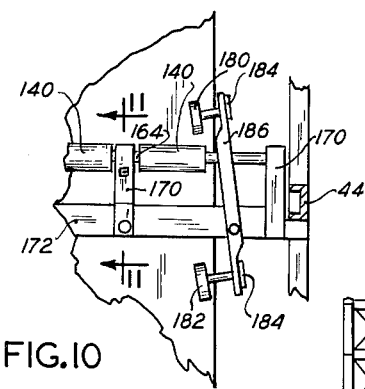
FIG. 10 is a fragmentary view of a portion of the machine taken substantially in the direction of the arrows 10—10 in FIG. 7.
Figure 11:
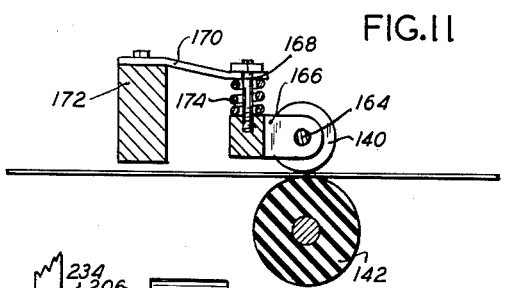
FIG. 11 is a sectional view taken substantially along line 11—11 of FIG. 10.
Figure 12:
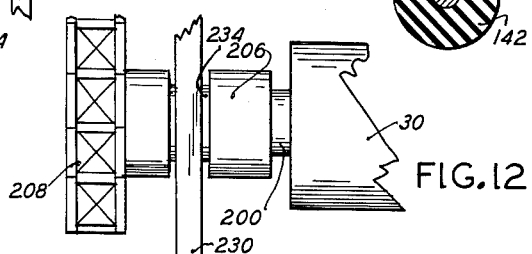
FIG. 12 is an enlarged fragmentary view of a portion of the machine looking in the direction of the arrows 12—12 of FIG. 5.

Means are provided to spread the sheets laterally as they pass between the draw rolls 140 and 142 so as to prevent any bunching or wrinkling of the sheets. Mounted fore and aft of the draw rolls 140 and 142 adjacent each of the opposite sides of the sheets are vertically opposed pairs of wheels 180 and 182 and between which the sheets A, B, C, and D are drawn. The wheels of each pair are so fixed with relation to one another as to pressurably engage the sheets therebetween whereby the wheels will be rotated by the motion of the sheets and the wheels are canted or set obliquely, as shown in FIG. 10, so that their direction of rotation is in the direction toward the adjacent edge of the sheets. The canted relation of the wheels 180 and 182 tends to urge the sheets sidewise so that the sheets are stretched between the opposite spreaders and maintained in a flattened condition. The wheels may be supported in any suitable manner, in the illustrated embodiment of the invention the pairs of wheels 180, 182 being rotatably mounted upon the depending legs 184 of a support member 186 secured to the cross brace 172.

Referring most particularly to FIG. 6, the rewind roll 30 is suspended so that it may be swung out to remove the roll after it is filled and a new mandrel inserted in its place upon which additional sheet material can be wound. One end of the mandrel 200 of the rewind roll is rotatably supported in an arm 202 hung from a universal pivot 204 positioned adjacent the top of one of the uprights 46 and which permits the arm 202 to be swung both longitudinally and laterally of the machine. The other end of the mandrel 200 is suspended in a chuck 206 to which is secured a sprocket 208. The sprocket 208 and chuck 206 are suspended in an endless chain 210 trained over a sprocket 212 fixedly secured to a stub shaft 214 journaled at the top of and on the upright 46 opposite to that to which the arm 202 is secured. Also secured to the stub shaft 214 is a further sprocket 216 over which is trained a chain 218 which extends over a sprocket on a stub shaft 222 journaled on the same upright 46 as the stub shaft 214 but near the bottom thereof. The stub shaft 222 is secured to a slip clutch 224 driven by a belt 226 running over a pulley 228 secured to the output shaft of the variable speed pulley 150. The slip clutch 224 permits the speed of rotation of the tape up roll 30 automatically to reduce as the roll builds up in diameter so that the peripheral speed will remain the same as the linear speed of the sheets feeding thereto.

It will be apparent that the overlapping of the folds 51, 54 at one side of the sheets and the presence of the fold 52 an the other side will cause a greater buildup of material at the edges of the roll 30 than in the middle leaving the center slack which increases somewhat the difficulty of handling the roll. To distribute the folds laterally of the roll 30 to some extent and minimize the edge buildup, I have provided means for shifting the roll laterally as material is wound thereon. It will be recalled that the arm 202 may swing laterally of the machine and the chain 210 has sufficient slack to permit the roll 30 to shift laterally a few inches. Thus, the roll may be shifted back and forth to distribute the folded edges. To facilitate the shifting, there may be provided a shift lever 230 pivoted at 232 for horizontal swinging movement. The lever 230 fits within a peripheral groove 234 in the chuck 206 so that as the lever is swung laterally, it will engage the clutch to swing the roll.

Though the present machine has been described in conjunction with the securing together of four individual sheets, it is obvious that the machine may be adapted to securing together other numbers of sheets and it is also obvious that other methods of joining the sheets together may be utilized. Thus having described a preferred embodiment of the invention, it is to be understood that the invention permits of modification in arrangement and detail. I claim as my invention all such modifications as come within the true spirit and scope of the appended claims.

I claim:

1. In apparatus for superposing a pair of substantially continuous sheets of pliant material and securing such sheets together along a longitudinal edge thereof, the combination comprising means for continuously feeding a pair of sheets to be joined into superposed position, means for wetting with a non-adhesive liquid a strip along one of said sheets adjacent a marginal edge portion thereof, means for overfolding to a position between said sheets said marginal edge portion of said one sheet, said strip being positioned to extend laterally to each side of the edge of said one sheet upon folding thereof, a reservoir for maintaining a supply of bond effecting fluid adhesive, means for continuously feeding the adhesive from said reservoir and positioning the same between the overfolded edge portion of said one sheet and said other sheet, and means for applying pressure to said sheets and the adhesive therebetween, said liquid being immiscible with said fluid adhesive.

2. In apparatus for superposing a pair of substantially continuous sheets of pliant material and securing such sheets together along a longitudinal edge thereof, the combination comprising means for continuously feeding a pair of sheets to be joined into superposed position, means for wetting with a non-adhesive a strip along one of said sheets adjacent a marginal edge portion thereof, means for overfolding to a position between said sheets said marginal edge portion of said one sheet, said strip being positioned to extend laterally to each side of the edge of said one sheet upon folding thereof, a reservoir for maintaining a supply of bond effecting fluid adhesive, a thread holder, means for drawing a thread from said holder through said reservoir to absorb said adhesive, means for feeding the adhesive charged thread and positioning the thread between the overfolded edge portion of said one sheet and said other sheet, and a pair of superposed rollers resiliently biased toward one another for applying pressure to said sheets and the thread therebetween, said liquid being immiscible with said fluid adhesive.

3. The method of bonding together the edge portion of a substantially continuous sheet of material to a second sheet of like material comprising the steps of continuously feeding said sheets into overlapping position, wetting with a non-adhesive liquid a strip along one of said sheets adjacent a marginal edge portion thereof, overfolding to a position between said sheets said marginal edge portion of said one sheet, said strip and said fold being so arranged that said strip extends laterally to each side of the edge of said one sheet upon folding thereof, feeding a bond effecting fluid adhesive between the overfolded edge portion of said one sheet and said other sheet, and applying pressure to said sheets and the adhesive therebetween, said liquid being immiscible with said fluid adhesive.

4. The method of bonding together the edge portions of a pair of substantially continuous sheets of pliant material comprising the steps of continuously feeding a pair of sheets to be joined into substantially superposed position, wetting with a non-adhesive liquid a strip along one of said sheets adjacent a marginal edge portion thereof, overfolding to a position between said sheets said marginal edge portion of said one sheet and aligning the fold line thereof substantially along the corresponding edge of the other of said sheets, said strip and said fold being so arranged that said strip extends laterally to each side of the edge of said one sheet upon folding thereof, feeding a bond effecting fluid adhesive between the overfolded edge portion of said one sheet and said other sheet, and applying pressure to said sheets and the adhesive therebetween, said liquid being immiscible with said fluid adhesive.

5. The method of bonding together the edge portions of a pair of substantially continuous sheets of pliant material comprising the steps of continuously feeding a pair of sheets to be joined into substantially superposed position, wetting with a non-adhesive liquid a strip along one of said sheets adjacent a marginal edge portion thereof, overfolding to a position between said sheets said marginal edge portion of said one sheet and aligning the fold line thereof substantially along the corresponding edge of the other of said sheets, said strip and said fold being so arranged that said strip extends laterally to each side of the edge of said one sheet upon folding thereof, feeding a thread through a bond effecting fluid adhesive to absorb said adhesive, feeding the liquid charged thread and positioning the same between the overfolded edge portion of said one sheet and said other sheet, and applying pressure to said sheets and the thread therebetween to express adhesive from said thread onto the adjacent portions of said sheets, said liquid being immiscible with said fluid adhesive.

References Cited in the file of this patent

UNITED STATES PATENTS

| | | |
|---|---|---|
| 2,440,664 | Irons | Apr. 27, 1948 |
| 2,511,031 | Yount | June 13, 1950 |
| 2,516,280 | Welch | July 25, 1950 |
| 2,651,588 | Bruce | Sept. 8, 1953 |
| 2,813,054 | Nicholas | Nov. 12, 1957 |